May 24, 1960  E. M. B. PAILLARSE  2,938,104
METHOD OF MACHINING TOOLS, TOOL EQUIPMENT FOR
OPERATING THIS OR SIMILAR METHODS AND TOOL
ACCORDING TO THOSE OBTAINED
Filed July 8, 1958  3 Sheets-Sheet 1

INVENTOR
EDMOND MARIE BARTHÉLEMY PAILLARSE

BY EZEKIEL WOLF, WOLF+GREENFIELD
HIS ATTORNEYS

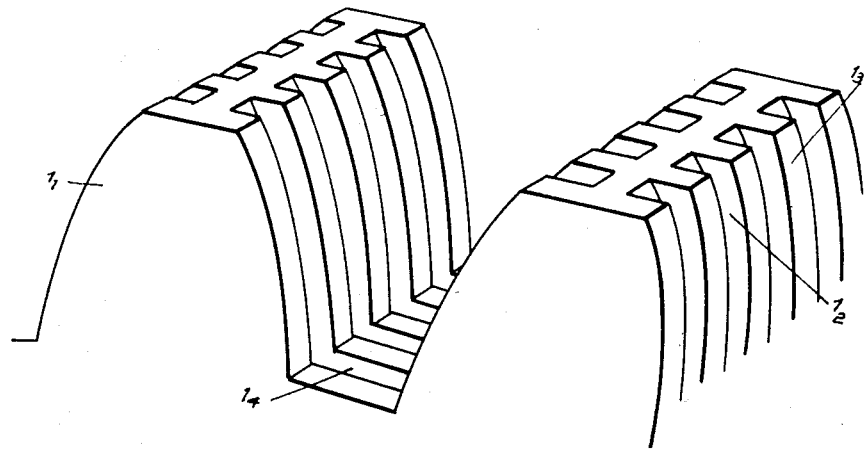
Fig. 2
Fig. 3
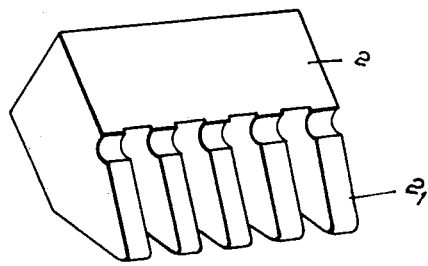
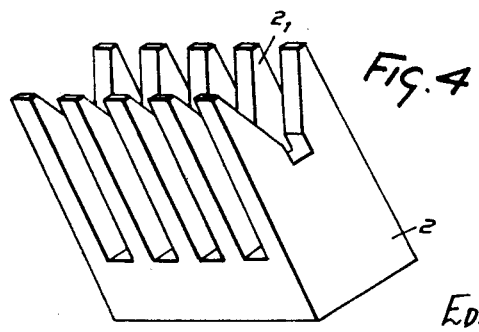
Fig. 4

May 24, 1960  E. M. B. PAILLARSE  2,938,104
METHOD OF MACHINING TOOLS, TOOL EQUIPMENT FOR
OPERATING THIS OR SIMILAR METHODS AND TOOL
ACCORDING TO THOSE OBTAINED

Filed July 8, 1958  3 Sheets-Sheet 3

EDMOND MARIE BARTHELEMY PAILLARSE
by EZEKIEL WOLF, WOLF + GREENFIELD
HIS ATTORNEYS.

United States Patent Office 2,938,104
Patented May 24, 1960

2,938,104

METHOD OF MACHINING TOOLS, TOOL EQUIPMENT FOR OPERATING THIS OR SIMILAR METHODS AND TOOL ACCORDING TO THOSE OBTAINED

Edmond Marie Barthelemy Paillarse, Asnieres, France, assignor to La Polymecanique, Pantin (Seine), France, a company of France Filed July 8, 1958, Ser. No. 747,313

Claims priority, application France Oct. 24, 1957

2 Claims. (Cl. 219—69)

The grooves made on tools used for finishing gears, are at present obtained by countersinking or mechanical mortising. This necessitates, at the base of each tooth, a hole enabling the milling-tool or other tool to be disengaged at the end of the stroke. These holes considerably reduce the mechanical strength of the teeth and are the principal cause of these very expensive tools being put out of service.

A first purpose of the invention is to achieve a method for machining tools to be used for finishing gears, enabling the holes to be eliminated that are usually made at the base of the teeth, and thus increasing the mechanical strength of the latter.

Another purpose of the invention is a tool enabling the application of the sparking process to the machining of tools to be used for finishing gears.

Another purpose of the invention is another tool for applying the sparking process to the machining of tools to be used for finishing gears, this tool enabling the uneven wear to be compensated of said lamellae by merely adjusting the slope of the tool in relation to the tooth of the tool for finishing gears, without being obliged to replace the tool.

The invention also applies to the characteristics hereinafter mentioned and to their various possible combinations.

A device according to the invention is shown by way of non-restrictive example, in the attached drawings, in which:

Figure 2 is a partial perspective view of a tool for finishing gears.

Figure 3 is a perspective view of another possible shape of the tool, acting as an electrode.

Figure 4 is a perspective view of another possible shape of the tool.

Figure 1:
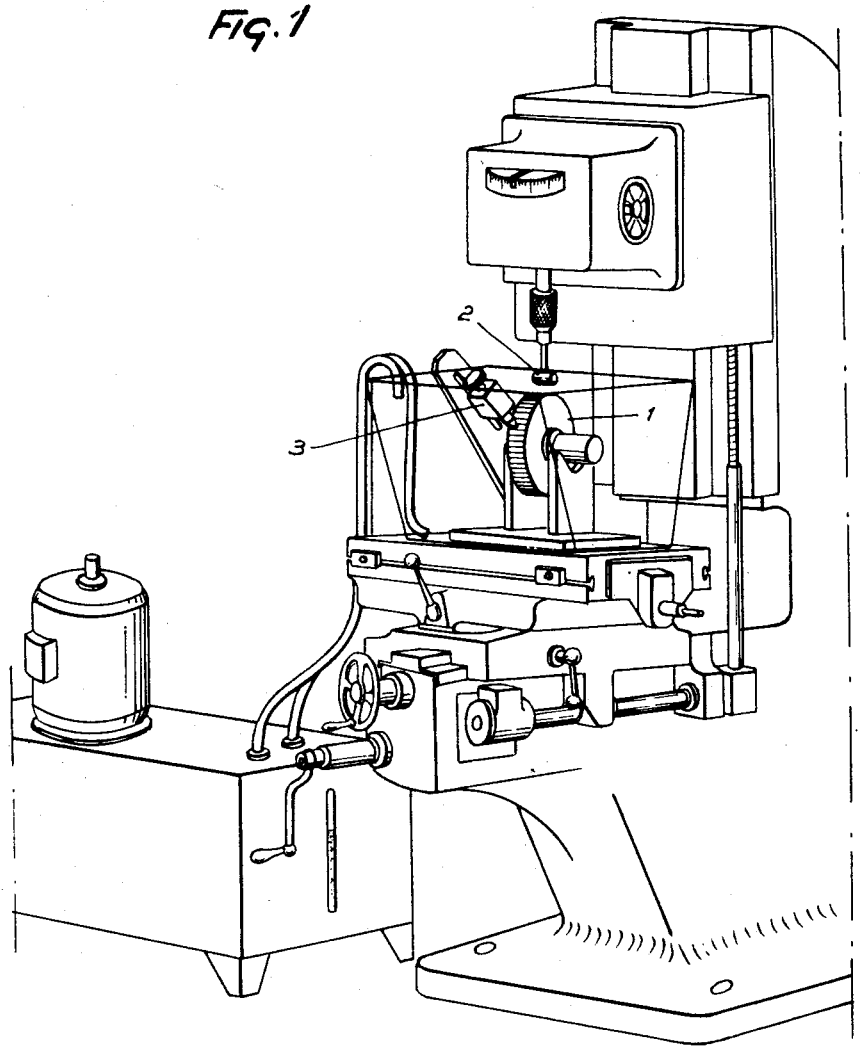
Figure 1 is a perspective view of an equipment for machining by sparking.

The part to be machined, in this case, the tool 1 intended for the finishing of gears, generally called a "shaving" tool; is mounted on the sparking machine shown in the attached Figure 1. This tool 1 is connected to one of the terminals of the machine and mounted on the latter so as to be able to revolve around its spindle placed horizontally and thus bringing the spaces, separating its teeth $1_1$, in front of the tool 2 connected to the other terminal of the machine and thus forming an electrode. This tool 2 has several parallel lamellae $2_1$ each a certain distance apart. Each lamella has an external contour in relation to the profile that is required.

Machining takes place in the following manner. The electrode 2 is brought down into the space separating two consecutive teeth $1_1$ of the part 1 in question, or astride a tooth of the part 1. The arcs spark between the lamellae and the teeth. Thus, the two faces opposite to each other or two consecutive teeth of a tooth are simultaneously machined. A current of 180 volts and 150 watts is used.

The electrode used is made of tungsten copper, for example.

During the operation, the part 1 and the electrode are plunged in a liquid which effects the cooling of the part of the part 1 that is being machined.

Figure 5:
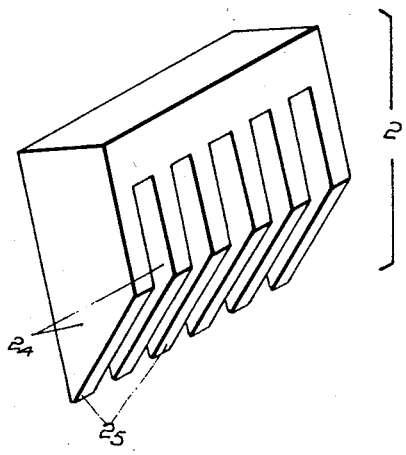
Figure 5 is a perspective view of another form of embodiment of the invention.

According to one form of embodiment of the invention shown in Figure 5, the tool comprises an assembly of lamellae $2_4$, each one having a contour in the shape of a right-angle trapeze.

The face $2_5$ of each lamella $2_4$, the face corresponding to the oblique side of the right-angle trapeze, is that which works. Each lamella $2_5$ terminates at its top in an acute angle.

When wear takes place, this acute angle will increase, for the top of the lamella, being narrower, wears more quickly than its base. At that moment, it will only be necessary to slope the tool at an angle equal to the wear angle, to bring the working face to the required slope, i.e., parallel to the face to be machined.

A tool of this kind can be made of brass, graphite, steel or any other material.

It goes without saying that the invention is not restricted to the examples of embodiment precisely described and shown and from which other alternatives can be obtained without going outside the scope of the invention for that purpose.

What I claim is:

1. Apparatus for machining a disc-like gear finishing tool having grooves circumferentially displaced along its circumferential face comprising, means for rotatably supporting said tool to permit rotation thereof about its axis, a source of electrical power connected between said tool functioning as a first electrode and a second electrode formed with a plurality of parallel spaced lamellae each having an edge face defining a surface with a contour corresponding to the desired surface contours of teeth of said tool separated by said grooves, and means for selectively positioning said second electrode into at least one of said grooves to cause sparking to occur between said lamellae and said tool whereby at least one tooth surface adjacent to said one groove assumes said desired surface contour.

2. A method of machining the faces of teeth in a gear finishing tool to assume a desired contour which method includes the steps of placing an electrode formed with parallel spaced lamellae each having an edge face shaped in accordance with said desired contour closely adjacent to one of said gear teeth with said edge faces generally parallel to the face of said tooth to be machined to assume said desired contour, applying an electrical potential between said electrode and said tool to cause a spark discharge therebetween whereby the latter face assumes said desired contour, imparting a relative angular displacement between said tool and said electrode to align said electrode with another of said teeth, and repeating the aforesaid steps until all said gear teeth faces assume said desired contour.

References Cited in the file of this patent

UNITED STATES PATENTS 2,650,979   Teubner _____ Sept. 1, 1953
2,813,966   Matulaitis _____ Nov. 19, 1957